United States Patent
Kitta

(10) Patent No.: US 8,027,422 B2
(45) Date of Patent: Sep. 27, 2011

(54) SYMBOL TIMING RECOVERY CIRCUIT

(75) Inventor: Tatsuaki Kitta, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 782 days.

(21) Appl. No.: 12/112,757

(22) Filed: Apr. 30, 2008

(65) Prior Publication Data

US 2009/0028279 A1    Jan. 29, 2009

(30) Foreign Application Priority Data

Jul. 25, 2007   (JP) .................. 2007-193071

(51) Int. Cl.
*H04L 7/00* (2006.01)

(52) U.S. Cl. ....................................... 375/355

(58) Field of Classification Search .................. 375/355
See application file for complete search history.

(56) References Cited

U.S. PATENT DOCUMENTS

| | | | |
|---|---|---|---|
| 6,504,869 B2 * | 1/2003 | Yedid | 375/232 |
| 6,563,897 B1 | 5/2003 | Kitta | |
| 7,106,823 B2 * | 9/2006 | Miller et al. | 375/376 |
| 7,173,994 B2 | 2/2007 | Kanazashi | |
| 7,177,376 B2 * | 2/2007 | Atungsiri et al. | 375/343 |

FOREIGN PATENT DOCUMENTS

| | | |
|---|---|---|
| JP | 3573627 | 7/2004 |
| JP | 2006-279332 | 10/2006 |

* cited by examiner

*Primary Examiner* — Juan A Torres
(74) *Attorney, Agent, or Firm* — Staas & Halsey LLP

(57) ABSTRACT

An analog-to-digital (A/D) converter samples an input signal with a first clock. An finite impulse response (FIR) filter generates data at a zero-crossing point/data decision point from the sampled data. A decimation circuit decimates an output of the FIR filter 2 with a second clock. A phase comparator detects a phase error of the output signal of the decimation circuit. An Numerically Controlled Oscillator (NCO) (A/D) generates a phase signal by integrating the phase error. A tap coefficient computing unit generates tap coefficients of the FIR filter in accordance with the phase signal. In the NCO, if the phase signal exceeds "π", "2π+the phase error" is subtracted from the phase signal.

12 Claims, 16 Drawing Sheets

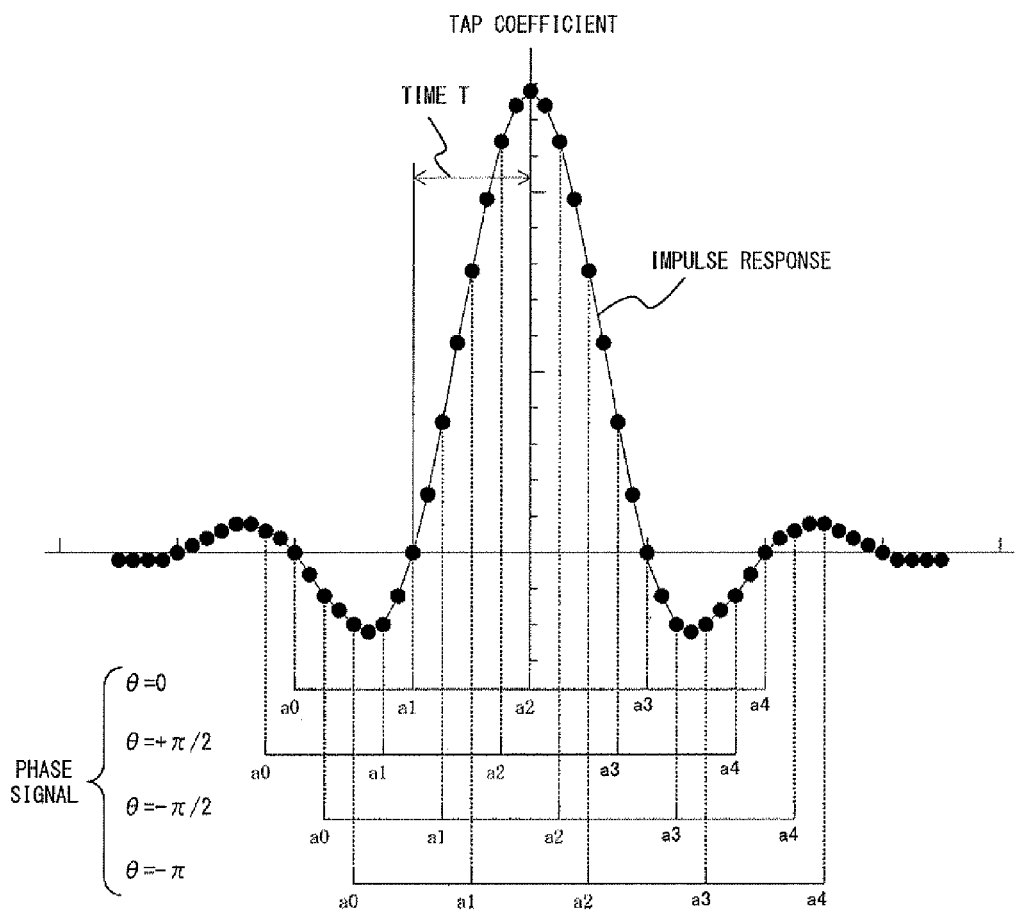
F I G. 5

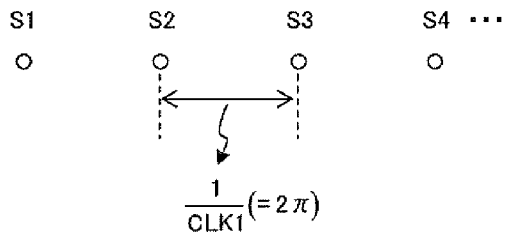
F I G. 8 A
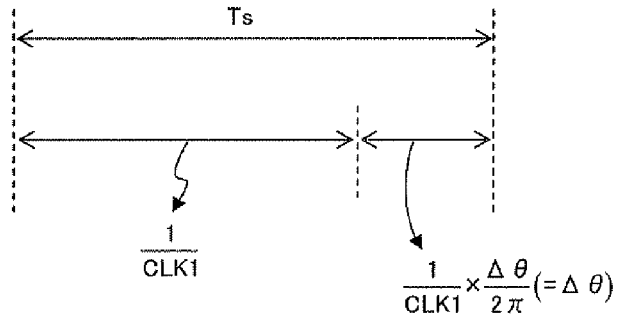
F I G. 8 B
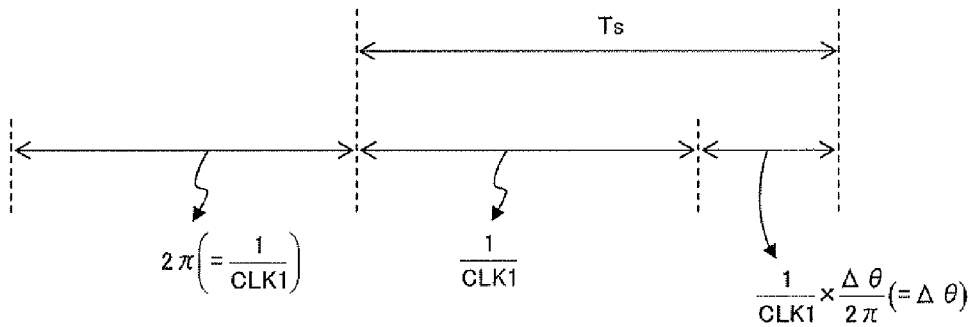
F I G. 8 C
CLK1 : FREQUENCY OF SAMPLING CLOCK
$\frac{1}{CLK1}$ : CYCLE OF SAMPLING CLOCK
$\Delta\theta$ : PHASE ERROR (PER ONE CLOCK)
PRIOR ART

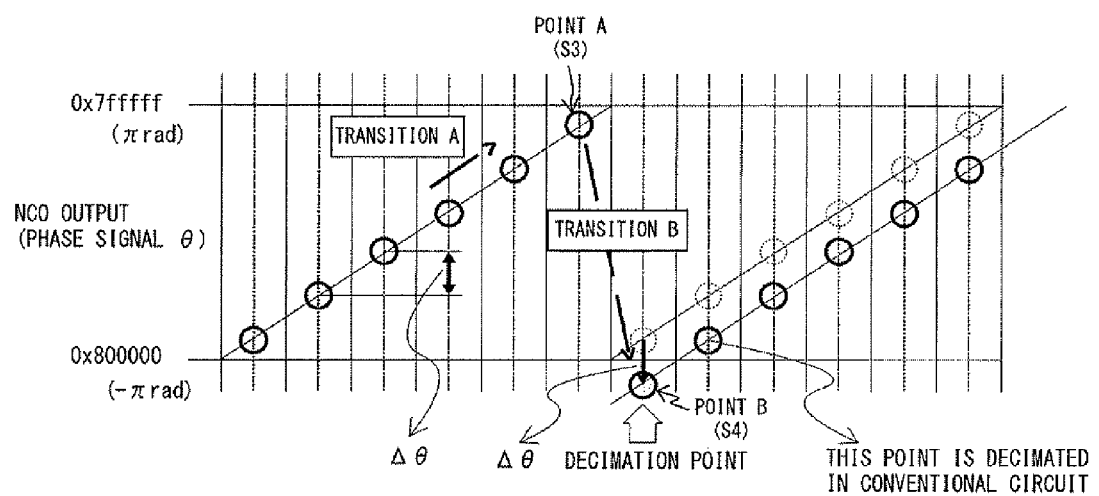
F I G. 1 0

CLK1 : FREQUENCY OF SAMPLING CLOCK $\frac{1}{CLK1}$ : CYCLE OF SAMPLING CLOCK $\Delta\theta$ : PHASE ERROR (PER ONE CLOCK)

US 8,027,422 B2

SYMBOL TIMING RECOVERY CIRCUIT

CROSS REFERENCE TO RELATED APPLICATION

This application is based upon and claims the benefit of priority from the prior Japanese Patent Application No. 2007-193071, filed on Jul. 25, 2007, the entire contents of which are incorporated herein by reference.

BACKGROUND OF THE INVENTION

1. Field of the Invention

The present invention relates to a symbol timing recovery circuit that recovers the symbol timing of an input signal.

2. Description of the Related Art

In general, recovery of a received signal in a communication system requires recovery of the symbol timing from the received signal. In the following description, a symbol timing recovery circuit described in Patent Document 1 (Japanese Patent No. 3573627) is explained with reference to FIG. 1.

In FIG. 1, an analog-to-digital (A/D) converter 1 converts an input signal (or a received signal) into a digital signal. The sampling rate of the A/D converter 1, $f_{samp}$, is the same or more than twice as fast as the symbol rate of an input signal, $f_s$ (That is to say, "$f_{samp} \geq f_s$). A FIR (Finite Impulse Response) filter 2 functions as an interpolator and obtains data at a data decision point and data at a zero-crossing point from a digital data string obtained by the A/D converter 1. A decimation circuit 3, when data obtained from the FIR filter 2 overlap, decimates one of the overlapped data.

A phase comparator 4 calculates an error between the data output from the decimation circuit 3 and the data at an ideal sampling point. A loop filter 5 smoothes (or averages) the outputs of the phase comparator 4. Numerically Controlled Oscillator (NCO) 6 operates as an integrator of infinite phase and oscillates at a frequency according to the output of the loop filter 5. A tap coefficient computing unit 7 calculates tap coefficients (a0-a4) to be provided to the FIR 2 based on the output signal of the NCO 6. A clock control circuit 8 generates a decimated (or partially inhibited) clock CLK2 from a sampling clock CLK1 based on the output signal of the NCO 6.

In the symbol timing recovery circuit of the above configuration, at the timing of the decimation clock CLK2, a value (data) at the data decision point and a value (data) at the zero-crossing point are alternately output. In other words, symbol timing is recovered.

It should be noted that Patent Document 2 (Japanese Patent Application Publication No. 2006-279332) describes a timing recovery circuit comprising a first oscillating circuit for outputting a first timing signal to an output terminal, a second oscillating circuit for outputting a second timing signal to an output terminal, a first decimation circuit coupled to a supply terminal of the first clock signal and to the output terminal of the first oscillating circuit and outputs the second clock signal to the output terminal by decimating pulses of the first clock signal in response to the first timing signal, and a second decimation circuit coupled to the output terminal of the first decimation circuit and to the output terminal of the second oscillating circuit and outputs a third clock signal to the output terminal by decimating pulses of the second clock signal in response to the second timing signal. Either one of the first timing signal or the second timing signal has a fixed cycle, and the other one has a cycle responsive to feedback control.

FIG. 2 is a diagram showing spectrum of the output signal of the symbol timing recovery circuit shown in FIG. 1. Note that the spectrum is obtained by a simulation of a 6M baud 256-QAM modulated signal.

As shown in FIG. 2, in the conventional symbol timing recovery circuit, a sideband wave that is not present in the input signal is generated. The sideband wave contains a frequency component corresponding to the frequency of the clock decimation, and its harmonic wave. The sideband wave causes deterioration of recovery accuracy of the symbol timing. The deterioration of recovery accuracy of the symbol timing would cause deterioration of BER (Bit Error Rate) characteristics.

SUMMARY OF THE INVENTION

According to an aspect of an embodiment, a symbol timing recovery circuit for recovering a symbol timing of an input signal includes a sampling unit for sampling the input signal using a first clock; an interpolation unit for generating interpolation data of the input signal by performing interpolation using sampled data obtained by the sampling unit; a decimation unit for decimating the interpolation data obtained by the interpolation unit using a second clock; a phase comparator for detecting a phase error of an output signal of the decimation unit; a loop filter for smoothing the output signal of the phase comparator; a numerically controlled oscillator for generating an oscillation signal with a frequency in accordance with an output of the loop filter; an interpolation control unit for controlling an operation of the interpolation unit in accordance with the oscillation signal; and a clock control unit for generating the second clock form the first clock in accordance with the oscillation signal. The numerically controlled oscillator generates the oscillation signal by cumulatively adding an output value of the loop filter and subtracting a certain value and the output value of the loop filter from the added value when the added value exceeds a threshold.

BRIEF DESCRIPTION OF THE DRAWINGS

FIG. 5 is a diagram for explaining operations of an FIR filter;

FIGS. 8A-8C are diagrams for explaining details of the operations of the conventional NCO;

FIG. 10 is a diagram for explaining operations of the NCO of the embodiment;

DESCRIPTION OF THE EMBODIMENTS

In a symbol timing recovery circuit on the embodiment, when the frequency of the first clock does not match the frequency twice as high as the symbol rate of the input signal, the phase of the sampled data obtained by the sampling unit gradually shifts. The numerically controlled oscillator calculates the phase shift, and the interpolation unit performs interpolation in accordance with the calculated phase shift. When the above frequencies do not match, data decimation is performed in accordance with the difference in the frequencies. At the timing of the decimation, the calculated value of the numerically controlled oscillator is adjusted for an amount in accordance with the data decimation. Here, the data decimated by the decimation unit is the same as the immediately previous data. In this adjustment, because the output value of the loop filter is subtracted, the phase represented by the calculated value of the numerically controlled oscillator should be the same in immediately before the decimation and in immediately after the decimation. Accordingly, occurrence of calculation errors in the numerically controlled oscillator can be prevented.

According to this configuration, the recovery accuracy of the symbol timing recovery circuit that recovers the symbol timing of the input signal is improved.

Figure 3:
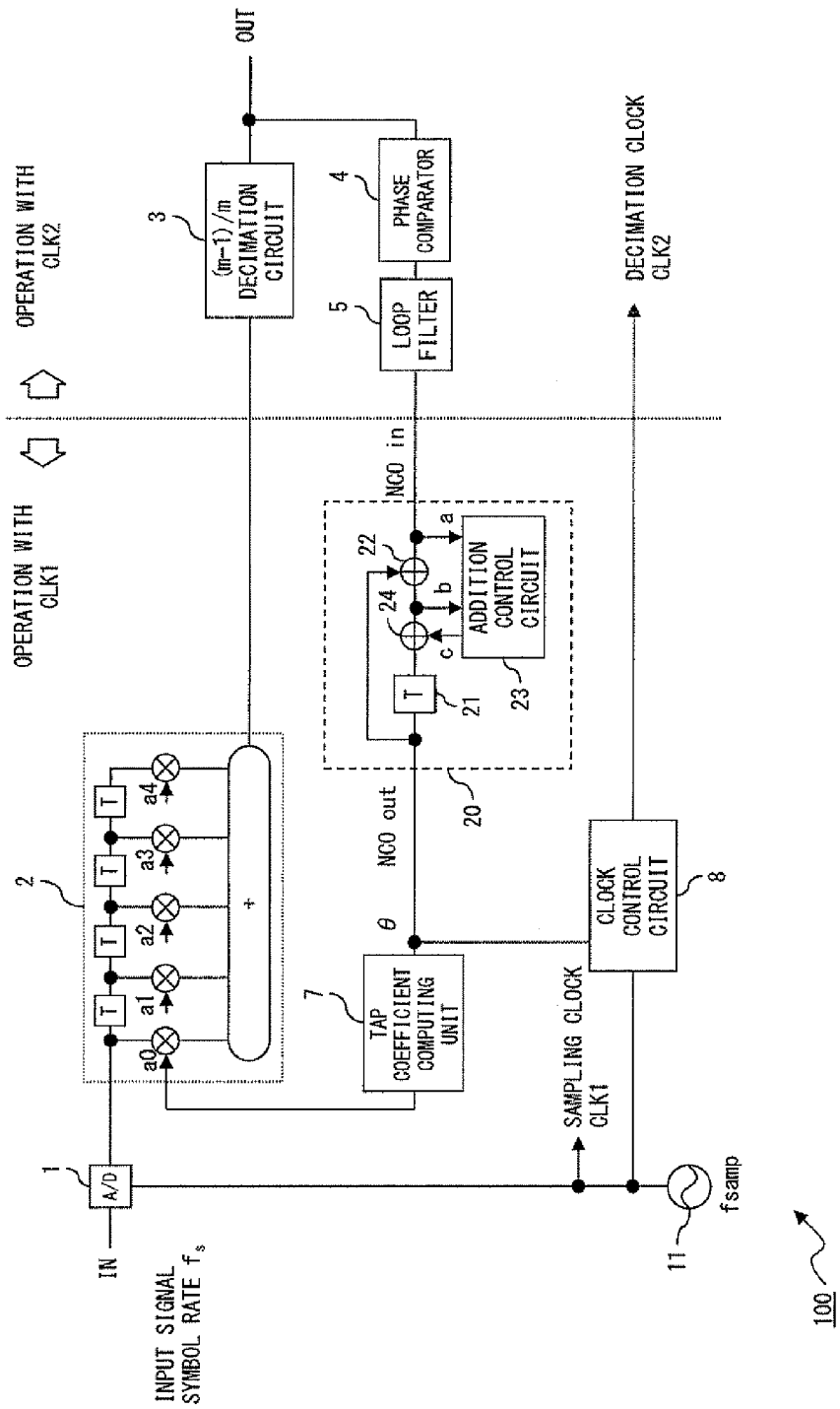
FIG. 3 is a diagram showing a configuration of a symbol timing recovery circuit of the embodiment.

FIG. 3 is a diagram showing a configuration of a symbol timing recovery circuit 100 of the embodiment. The symbol timing recovery circuit 100 comprises an A/D converter 1, an FIR filter 2, a decimation circuit 3, a phase comparator 4, a loop filter 5, a Numerically Controlled Oscillator (NCO) 20, a tap coefficient computing unit 7, and a clock control circuit 8. Here, the A/D converter 1, the FIR filter 2, the NCO 20, the tap coefficient computing unit 7, and the click control circuit 8 are operated with a clock CLK1 generated by an oscillator 11. On the other hand, the decimation circuit 3, the phase comparator 4, are the loop filter 5 are operated with a clock CLK2. The clock CLK 2 is generated from the clock CLK1. Details of the clock CLK2 are explained later.

In the symbol timing recovery circuit 100 having the above configuration, the A/D converter 1, the FIR filter 2, the decimation circuit 3, the phase comparator 4, the loop filter 5, the tap coefficient computing unit 7, and the clock control circuit 8 are not limited in particular but may be the same as those in the symbol timing recovery circuit described in Patent Document 1. However, the NCO 20, unlike the NCO described in Patent Document 1, has an addition control function that is explained later.

A signal input to the symbol timing recovery circuit 100 is not limited in particular, however, it is a signal received by a receiver in a communication system. The received signal is for example a Phase Shift Keyed (PSK) or Quadrature Amplitude Modulator (QAM) modulated signal. In the following description, operations of the symbol timing recovery circuit 100 are explained with reference to FIGS. 4, 5, and 6A-6D.

In the symbol timing recovery circuit having the above configuration, the A/D converter 1 converts an input signal into a digital signal with the clock CLK1 generated by the oscillator 11. The sampling rate $f_{samp}$ of the A/D converter 1 (i.e. the frequency of the clock CLK1) is more than twice as high as the symbol rate $f_s$ of the input signal. In the example shown in FIG. 4(a), sampled data s1-s14 are obtained by means of the A/D converter 1. Note that in FIG. 4(a), open circles indicate sampling points, and black circles indicate zero-crossing points and data decision points of the input signal.

The FIR filter 2 in the present embodiment is a 5-tap digital transversal filter having four delay elements, five multipliers, and an adder. The FIR filter 2 generates data sequence of the input signal at the data decision points and at the zero-crossing points by performing interpolation with the use of the sampled data obtained by the A/D converter 1.

Figure 4:
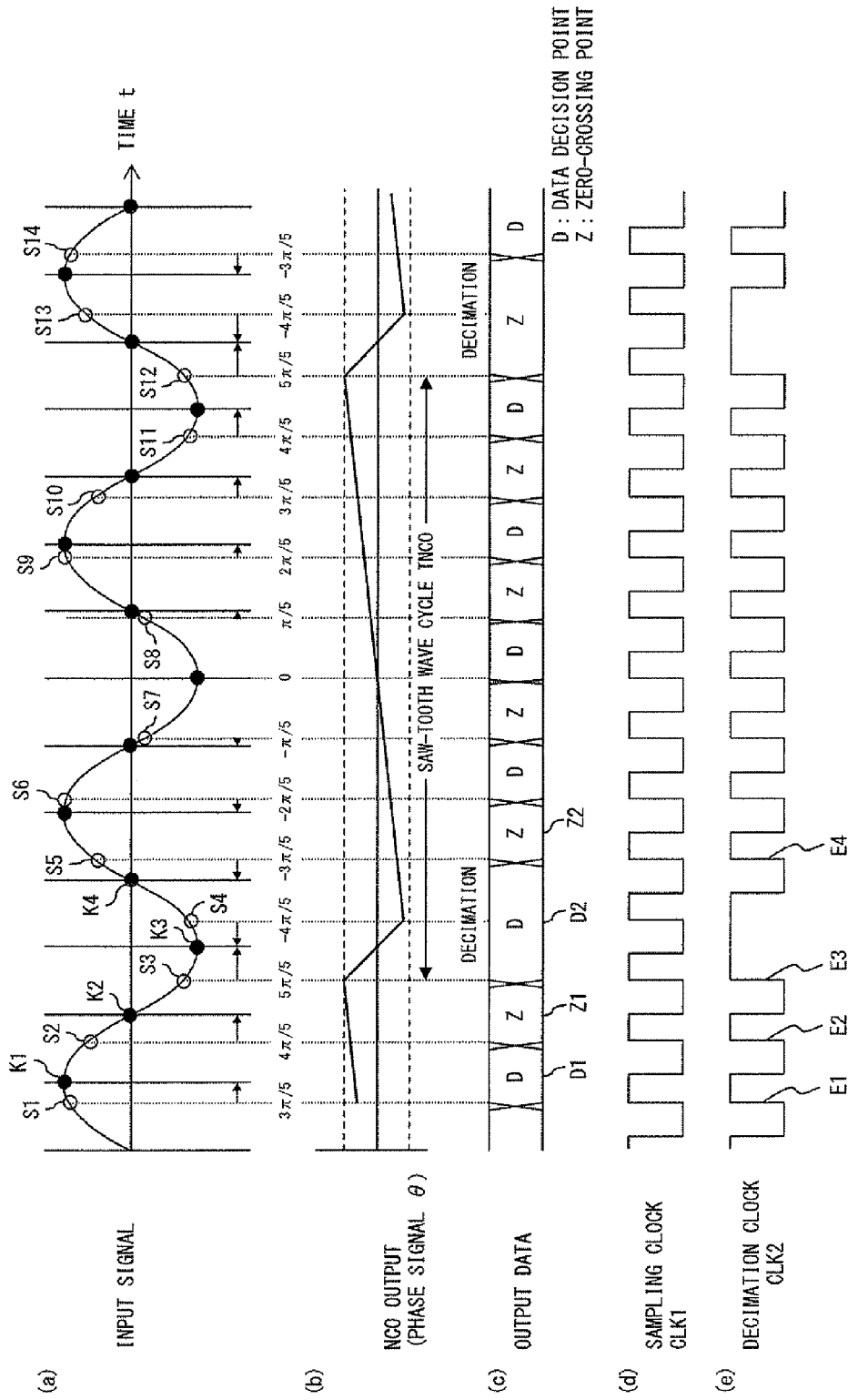
FIG. 4 is a timing chart for an explanation of operations of the symbol timing recovery circuit of the embodiment.

It should be noted that in the embodiment shown in FIG. 4, data of the input signal at the data decision points and the zero-crossing points are generated by the interpolation. However, it is also practicable to generate data at one of the data decision points or the zero-crossing points (e.g. only at the data decision points).

FIG. 5 is a diagram explaining the operations of the FIR filter. The characteristic shown in FIG. 5 corresponds to impulse response of a lowpass filter with the cutoff frequency being "$2f_s$". Time T corresponds to the amount of delay in each of the delay elements in the FIR filter 2. Note that the time T corresponds to one cycle of the clock CLK1 (i.e. $2\pi$).

The FIR filter 2 adjusts the phase of the input signal based on the five tap coefficients (or tap weights) a0-a4. Here, the tap coefficients a0-a4 are determined according to a phase signal $\theta$ in the tap coefficient computing unit 7 explained later. For example, if the phase signal $\theta$ is "zero", the impulse response other than the tap coefficient a2 would be zero. In such a case, the FIR filter 2 operates as a delay device with the delay time being 2T. If the phase signal $\theta$ is "+$\pi$/2", corresponding five tap coefficients a0-a4 are provided and the delay time in the FIR filter 2 is to be "2T+T/4". In this case, the input signal is delayed in phase by "T/4 (i.e. $\pi$/2)" by passing through the FIR filter 2. If the phase signal $\theta$ is "-$\pi$/2", corresponding five tap coefficients a0-a4 are provided, and the delay time in the FIR filter 2 is "2T-T/4". In this case, the input signal is advanced in phase by "T/4 (i.e. $\pi$/2)" by passing through the FIR filter 2. In this manner, the FIR filter 2 can adjust the phase of the input signal.

In FIG. 4(a), for example, sampled data s1 is delayed in phase by $3\pi/5$ with respect to a data decision point k1. In this case, the FIR filter 2 is provided with tap coefficients a0-a4 that are to advance the input signal in phase by $3\pi/5$. Consequently, the FIR filter 2 outputs a value at the data decision point k1. Sampled data s2 is delayed in phase by $4\pi/5$ with respect to the zero-crossing point k2. In this case, the FIR filter 2 is provided with tap coefficients a0-a4 that are to advance the input signal in phase by $4\pi/5$. Consequently, the FIR filter 2 outputs a value at the zero-crossing point k2. Sampled data s3 is delayed in phase by $\pi$ with respect to the data decision point k3. In this case, the FIR filter 2 is provided with tap coefficients a0-a4 that are to advance the input signal in phase by $\pi$. Consequently, the FIR filter 2 outputs a value at the data decision point k3. In this manner, the FIR filter 2 outputs values at the data decision points and at the zero-crossing points of an input signal by performing interpolation employing sampled data.

Sampled data s4 is delayed in phase by $6\pi/5$ with respect to the zero-crossing point k4. However, this sampling point is closer to the data decision point k3 than to the zero-crossing point k4. In other words, the sampled data s4 is advanced in phase by $4\pi/5$ with respect to the data decision point k3. In this case, therefore, the FIR filter 2 is provided with tap coefficients a0-a4 that are to delay the signal in phase by $4\pi/5$. Consequently, the FIR filter 2 outputs a value at the data decision point k3. However, the corrected sampled data s3 is also output at the data decision point k3. As a result, the corrected sampled data s3 and s4 overlap at the data decision point k3. The same result occurs to sampled data s12 and s13.

As described above, in the symbol timing recovery circuit 100, the clock CLK1 has a frequency more than twice as high as a frequency of the symbol rate $f_s$. For that reason, the number of samples obtained by the A/D converter 1 is more than the sum of the number of the data decision points and the number of the zero-crossing points of the input signal. Accordingly, in order to recover timing synchronized with the input signal (i.e. to recover symbol timing), the corrected sampled data output from the FIR filter 2 needs to be decimated.

The decimation circuit 3 is for example a flip-flop circuit, and decimates output data of the FIR filter 2 in accordance with decimation clock CLK 2 generated by the clock control circuit 8. In the example shown in FIG. 4(a), one of the corrected sampled data s3 and s4 (in the present embodiment, s4) is decimated, and one of the corrected sampled data s12 and s13 (in the present embodiment, s13) is decimated.

In such a manner, the decimation circuit 3 outputs data at the data decision point and data at the zero-crossing point alternately at the timing of the decimation clock CLK2. In other words, the symbol timing is recovered.

The phase comparator 4 detects a phase error ($\Delta\theta$) of the output signal of the decimation circuit 3. In the present embodiment, the phase comparator 4 detects a phase error with respect to an ideal the zero-crossing point by employing three consecutive values obtained by the decimation circuit 3. In the following description, operations of the phase comparator 4 are explained with reference to FIGS. 6A-6D.

When the three consecutive values are in monotonic decrease (i.e. d(r−1)>d(r)>d(r+1)), a phase error is detected according to an equation (1) provided below. Note that "d(r)" indicates an output value of the decimation circuit 3 at the zero-crossing points, and "d(r−1)" and "d(r+1)" indicate output values of decimation circuit 3 at the data decision points, respectively.

$$\text{Phase error} = \{d(r) - d(r+1)\} - \{d(r-1) - d(r)\} \quad (1)$$
$$= 2d(r) - \{d(r+1) + d(r-1)\}$$

Figure 6A:
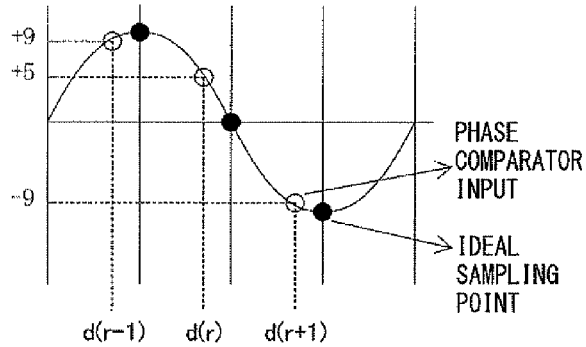
FIGS. 6A-6D are diagrams for explaining operations of a phase comparator.

In the example shown in FIG. 6A, "+10" is obtained according to the equation (1). In other words, if the phase is advanced, a positive value is obtained as phase error data. On the other hand, in the example shown in FIG. 6C, "−8" is obtained according to the equation (1). In other words, if the phase is delayed, a negative value is obtained as phase error data.

When the three consecutive values are in monotonic increase (i.e. d(r−1)<d(r)<d(r+1)), the phase error is detected according to an equation (2) provided below.

$$\text{Phase error} = \{d(r+1) - d(r)\} - \{d(r) - d(r-1)\} = -2d(t) + \{d(r+1) + d(r-1)\} \quad (2)$$

Figure 6B:
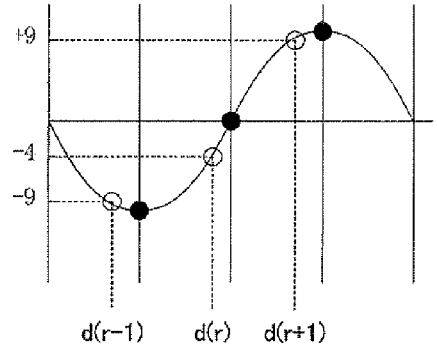
Figure 6C:
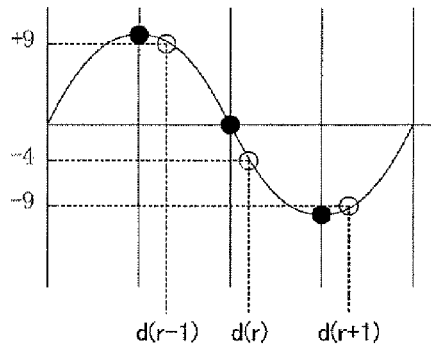
Figure 6D:
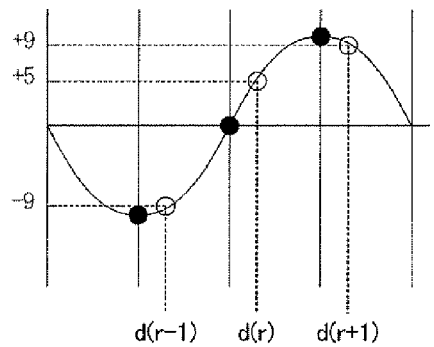

In the example shown in FIG. 6B, "+8" is obtained according to the equation (2). In other words, if the phase is advanced, a positive value is obtained as phase error data. On the other hand, in the example shown in FIG. 6D, "−10" is obtained according to equation (2). In other words, if the phase is delayed, a negative value is obtained as phase error data.

When the three consecutive values are neither in monotonic increase nor in monotonic decrease, the phase error is not to be calculated.

As described above, if phase of the output signal of the decimation circuit 3 is advanced with respect to an ideal state, the phase comparator 4 outputs a positive value as phase error data. On the other hand, phase of the output signal of the decimation circuit 3 is delayed with respect to the ideal state, a negative value is output as phase error data.

The loop filter 5 smoothes (or averages) the phase error data output from the phase comparator 4. In other words, the loop filter 5 operates as a lowpass filter. The phase error data smoothed by the loop filter 5 is provided to the NCO 20. The phase error data obtained by the loop filter 5 converge with an approximately constant value. It should be noted that the symbol timing recovery circuit 100 may be realized without the loop filter 5.

The NCO 20 has a delay element 21, an adder 22, an addition control circuit 23, and an adder 24, and operates as an integrator of infinite phase (or a perfect integrator). The phase error data provided from the loop filter 5 is cumulatively added by the delay element 21 and the adder 22. In other words, the phase error data is integrated to generate a phase signal θ. Basically, the phase error data here is approximately constant. As a results the phase signal θ obtained by the NCO 20 shows approximately linear increase over time as shown in FIG. 4(b). Note that FIG. 4(b) is under the assumption that the phase error data is a positive value.

It should be noted that the delay element 21 is for example a flip-flop circuit. In this case, the flip-flop circuit operates with the sampling clock CLK1. The output value of the delay element 21 is output as the phase signal θ and is provided to the adder 22. The adder 22 adds the phase error data output from the loop filter 5 to the output value of the delay element 21.

The above phase error data represents phase error per one symbol. Therefore, by integrating the phase error data it is possible to obtain an amount of phase shift at the sampling points from the zero-crossing points or the data decision points of the input signal.

The NCO 20 has a pair of reference values set as explained later in details. The pair of reference values is defined so as to indicate "+π" and "−π" when values are converted into the phase of the input signal. The phase signal θ obtained by the NCO 20 is reset if its value exceeds one of the reference values (in this case, "+π"). Here, to reset means processing to add "2π" to the phase signal θ (or processing to subtract "2π" from the phase signal θ).

As a result, the waveform of the phase signal θ generated by the NCO 20 shows saw-tooth waves as shown in FIG. 4(b). Here, since the pair of reference values "+π" and "−π" is set in the NCO 20, the phase signal θ (i.e. saw-tooth wave) changes approximately within a range between "+π" and "−π". However, as explained later, the phase signal θ can be beyond the range between "+π" and "−π". The cycle of the saw-tooth wave $T_{saw}$ is expressed with the sampling clock $f_{samp}$ and the symbol rate of the input signal $f_s$ as in an equation (3) provided below.

$$1/T_{saw} = f_{samp} - 2f_s \quad (3)$$

It should be noted that the above-described reset operation is executed by the addition control circuit 23. Operations of the addition control circuit 23 are explained later.

The tap coefficient computing unit 7 provides tap coefficients a0-a4 corresponding to the phase signal θ generated by NCO 20 to the FIR filter 2. Note that the operations of the tap coefficient computing unit 7 are the same as the operations explained with reference to FIG. 5.

The clock control circuit 8 generates the decimation clock CLK2 from the sampling clock CLK1 on the basis of the phase signal θ generated by the NCO 20. In the example shown in FIG. 4, when the phase signal θ exceeds the reference value "+π" and the phase signal θ is reset, by decimating one pulse of the sampling clock CLK1, the decimation clock CLK2 is generated. The cycle of the decimation clock CLK2 is not constant; however, its average frequency is $2f_s$.

The decimation circuit 3 decimates output data of the FIR filter 2 according to the decimation clock CLK2. In the present embodiment, the decimation circuit 3 is a single flip-flop circuit, and reads and outputs the output data of the FIR filter 2 at, for example, a rising edge or a falling edge of the decimation clock CLK2. In the example shown in FIG. 4, data at a data decision point D1 is output at a rising edge E1. Next, data at a zero-crossing point Z1 is output at a rising edge E2. Additionally, data at a data decision point D2 is output at a rising edge E3, and data at a zero-crossing point Z2 is output at a rising edge E4. Afterwards, data at data decision points and data at zero-crossing points are output alternately in accordance with the decimation clock CLK2 in the same manner.

In the symbol timing recovery circuit 100 of the present embodiment, the following processing is performed.
(1) An input signal is sampled with the sampling clock CLK1
(2) Each sampling data is converted into data decision point data/zero-crossing point data by the interpolation operation in the FIR filter 2. The sampling clock CLK1, however, has more than twice as fast as the symbol rate $f_s$ of the input signal. As a result, a part of the data decision point data/zero-crossing point data overlaps by the interpolation operation.
(3) The data decision point data/zero-crossing point data is decimated according to the decimation clock CLK2. Here, the average frequency of the decimation clock CLK2 is twice of that of the symbol rate $f_s$ of the input signal. In other words, when the data decision point data and zero-crossing point data overlap, one of the data is decimated. As a result, the data decision point data/zero-crossing point data of the input signal is recovered with the clock with a rate twice as fast as the symbol rate $f_s$ of the input signal. Accordingly, the symbol timing is recovered.

Next, details of the operations of the NCO are explained. Before the explanation of the operations of the NCO 20 of the present embodiment, a cause of the problems in conventional art is discussed.

Figure 1:
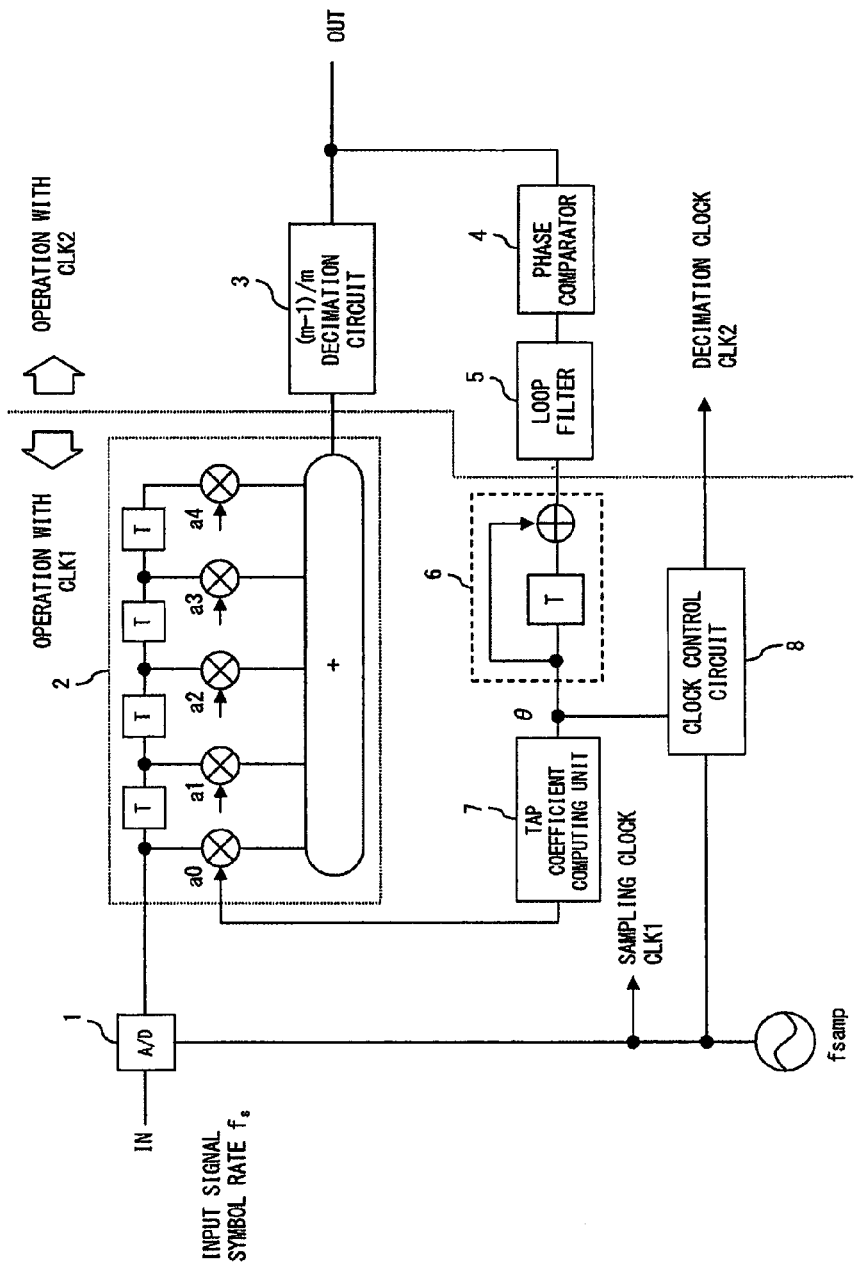
FIG. 1 is a diagram showing a configuration of a symbol timing recovery circuit described in Patent Document 1.
Figure 7:
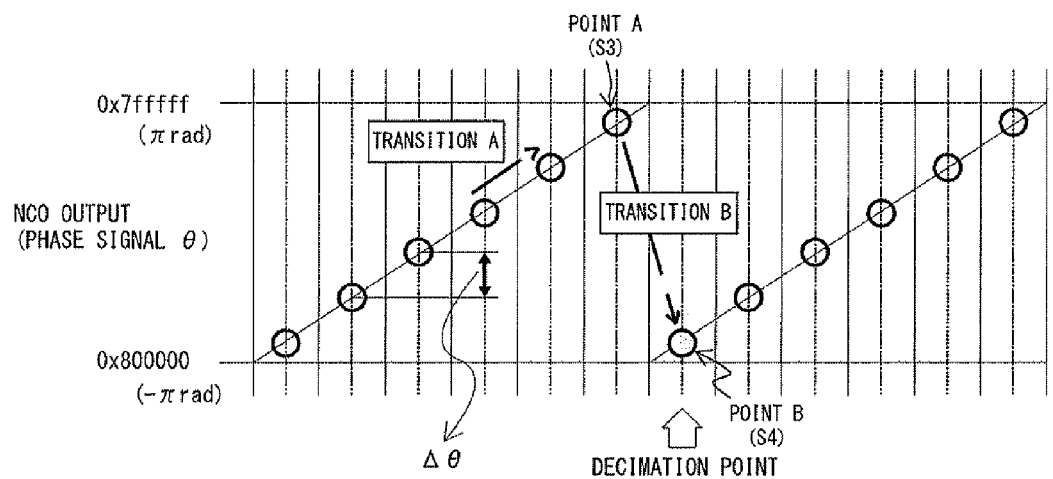
FIG. 7 is a diagram for explaining operations of a conventional NCO.

FIG. 7 is a diagram explaining the operations of NCO used in the conventional symbol timing recovery circuit (e.g. the NCO 6 in FIG. 1). In FIG. 7, time is on the horizontal axis and the output of the NCO (the phase signal θ) is on the vertical axis. Here, assume that the NCO has a 24-bit configuration, and outputs "0x800000(−8388608)" to "0x7fffff (8388608)" (two's complements). In addition, "0x800000" and "0x7fffff" are defined as "−π" and "+π", respectively.

Phase error data Δθ is provided to the NCO at every clock timing. The phase error data Δθ is, as described above, detected in the phase comparator 4, and is provided to the NCO via the loop filter 5. In addition, the phase error data Δθ is approximately constant while the system is stable. Then, by cumulatively adding the phase error data Δθ, the phase signal θ is generated. Accordingly, the phase signal θ output from the NCO shows approximately linear increase (transition A). Here, the phase error is a positive value.

When the phase signal θ exceeds "0x7fffff (+π)", "2π" is subtracted from the phase signal θ (transition B). The same operations are repeated afterwards. Note that at timing when "2π" is subtracted from the phase signal θ, a pulse of the sampling clock CLK1 is decimated and the decimation clock CLK2 is generated. In other words, when the transition B occurs, decimation of the data decision point data/zero-crossing point data is performed in the decimation circuit 3.

Details of the operations of the NCO and their problems in the conventional art are explained. Here, in the symbol timing recovery circuit, the input signal is sampled with the sampling clock CLK1. In other words, when the sampling clock CLK1 has a frequency of "CLK1", the sampling data s1, s2, s3, s4, . . . is obtained at intervals of "1/CLK1" as shown in FIG. 8A. The NCO converts the intervals "1/CLK1" into "2π". Note that the interval "1/CLK1" is a cycle of the sampling clock CLK1.

FIG. 8B is a diagram showing the count-up operations of the NCO. The count-up operations correspond to the transition A shown in FIG. 7. Note that in FIG. 8B, "$T_s$" indicates a time interval of an ideal signal point after timing recovery (i.e. a signal point generated by interpolation).

During the count-up operations, "Δθ" is added per one clock in the NCO. Here, the NCO converts "2π" into the time interval "1/CLK1". Accordingly, the time interval T1 generated in the NCO is expressed an equation (4) provided below.

$$T1 = (1/CLK1) + (1/CLK1) \times (\Delta\theta/2\pi) = T_s \quad (4)$$

Here, "(1/CLK1)×(Δθ/2π)" is "Δθ". In other words, while in the count-up period, time corresponding to the phase error Δθ is added to time corresponding to one cycle of the sampling clock CLK1.

FIG. 8C is a diagram explaining operations performed when the phase of the NCO shifts by 2π. At the time of 2π-shift, in addition to the count-up operation shown in FIG. 8B, an operation to subtract "2π" is performed. The phase angle of the NCO "2π" corresponds to the time interval "1/CLK1". In other words, "2π-shift" corresponds to an operation to delay the NCO in phase by one cycle of the sampling clock CLK1. The time interval T1 generated in the NCO at the time of 2π-shift is expressed by an equation (5) provided below.

$$\begin{aligned} T1 &= (1/CLK1) + (1/CLK1) \times (\Delta\theta/2\pi) - (1/CLK1) \\ &= (1/CLK1) \times (\Delta\theta/2\pi) \\ &= \Delta\theta \end{aligned} \quad (5)$$

As described above, at the time of the 2π-shift, the phase advances by (1/CLK1)×(Δθ/2π) (i.e. Δθ).

At the time of the 2π-shift, decimation of the data decision point data/zero-crossing point data is performed in the decimation circuit 3, as described above. In the example of FIG. 4, for example, sampling data s3 and s4 overlap, and the sampling data s4 is decimated. In the example shown in FIG. 7, when the phase signal θ output from the NCO transits from a point A to a point B, the point B is to be a decimation point. In addition, as shown in the equation (5) above, the phase signal θ advances by "Δθ" at the decimation point.

On the other hand, both of the sampling data s3 and s4 are converted into the data at the data decision point k3 by the FIR filter 2 as shown in FIG. 4. In other words, in FIG. 7, the phase signal θ at the point A and the phase signal θ at the point B should be the same as each other (or a state that one is shifted by 2π from another). However, in the NCO of the conventional art, the phase signal θ at the point A and the phase signal θ at the point B are shifted by Δθ from one another as shown in the equation (5). This error Δθ causes the side waves shown in FIG. 2.

In order to solve the problem, the symbol timing recovery circuit 100 of the present embodiment has a function to compensate for the phase error Δθ at the time of the 2π-shift.

Figure 9:
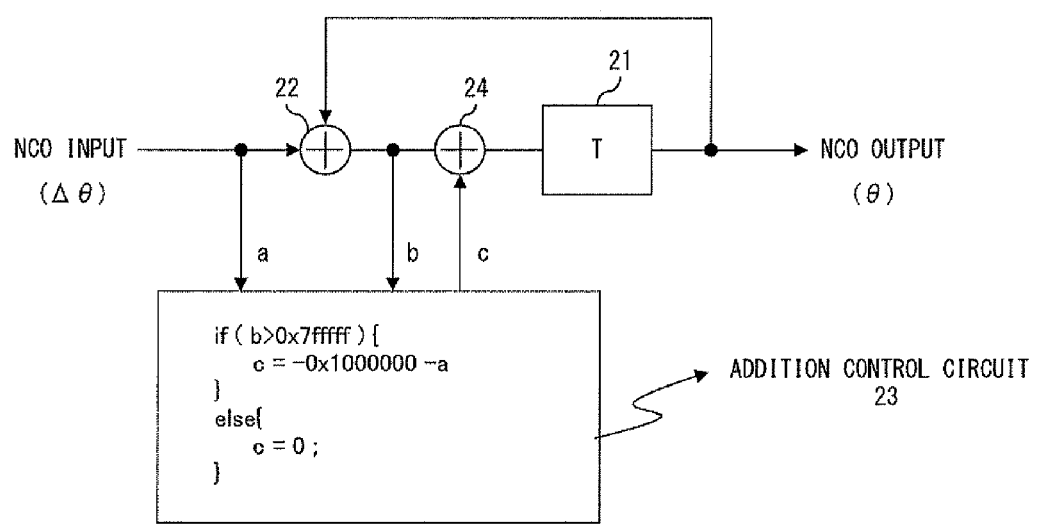
FIG. 9 is a diagram showing a configuration of an NCO of the embodiment.

FIG. 9 is a diagram showing the configuration of NCO 20 of the present embodiment. Note that the input of the NCO 20 is the phase error data Δθ, and the output of the NCO 20 is the phase signal θ. The NCO 20 in the present embodiment has a 25-bit configuration, and outputs "0x1400000(−12582912)" to "0x7fffff (8388607)" (two's complements). "0x7fffff" corresponds to "+π", and "0x1400000" corresponds to "−1.5π".

In FIG. 9, the delay element 21 and the adder 22 constitute an integrator. In other words, according to the sampling clock CLK1, Δθ is added cumulatively. The phase signal θ that represents the cumulative addition result is output.

The addition control circuit 23 executes the following operations according to the sampling clock CLK1.

```
if (b>0x7fffff) {
    c=−0x1000000−a
}
else{
    c=0;
}
```

Here, "a" indicates the phase error data Δθ provided to the NCO 20 from the loop filter 5. "b" indicates the phase signal θ that is a cumulative addition value in the NCO 20, "c" is a correction value generated by the addition control circuit 23. The adder 24 adds the correction value c to the phase signal θ.

The addition control circuit 23, when the phase signal θ does not exceed "+π(0x7fffff)", outputs "0" as a correction value c. In this case, the NCO 20 outputs the unchanged phase signal θ. On the other hand, the addition control circuit 23, when the phase signal θ exceeds "+π(0x7fffff)", outputs "−0x1000000−a" as a correction value c. Here, "0x1000000" corresponds to "2π". "a" indicates the phase error data Δθ. In other words, the addition control circuit 23, when the phase signal θ exceeds "+π(0x7fffff)", outputs "−2π−Δθ" as a correction value c. In this case, the NCO 20 adds "−2π−Δθ" to the phase signal θ. In other words, the NCO 20 subtracts "2π" and further subtracts "Δθ" from the phase signal θ.

FIG. 10 is a diagram explaining operations of NCO 20 of the present embodiment. As shown in FIG. 10, during a period in which the phase signal θ is smaller than "+π", like the conventional art shown in FIGS. 8A-8C, the phase signal θ output from the NCO 20 shows approximately linear increase (transition A).

When the phase signal θ exceeds "0x7fffff(+π)", in the NCO 20, "2π+Δθ" is subtracted from the phase signal θ (transition B). The above operations are repeated afterwards. Note that at the timing when "2π+Δθ" is subtracted from the phase signal θ, the sampling clock CLK1 is decimated, and the decimation clock CLK2 is generated. In other words, when the transition B occurs, the decimation of the data decision point data/zero-crossing point data is performed in the decimation circuit 3.

Figure 11A:
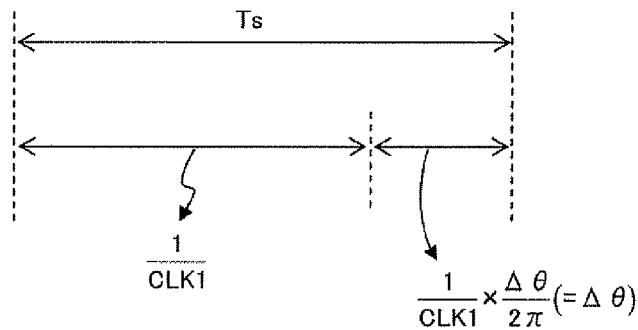
FIGS. 11A-11B are diagrams for explaining details of the operations of the NCO of the embodiment.
Figure 11B:
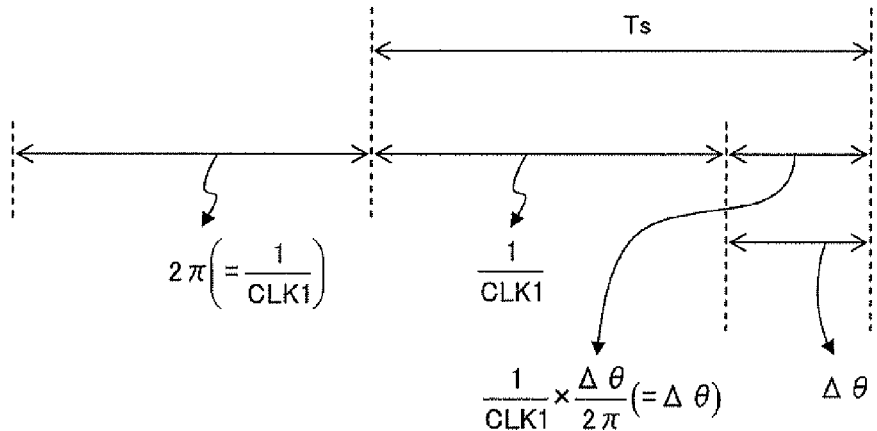

FIGS. 11A-11B are diagrams explaining the details of the NCO of the present embodiment. Note that the operations of count-up shown in FIG. 11A is the same as the operations explained with reference to FIG. 5B.

FIG. 11B is a diagram explaining operations when the phase of the NCO 20 of the present embodiment shifts by 2π. At the time of the 2π-shift, in addition to the count-up processing shown in FIG. 11A, processing to subtract "2π+Δθ" is performed. The phase angle of the NCO "2π" corresponds to the time interval "1/CLK1". The phase error Δθ corresponds to "(1/CLK1)×(Δθ/2π)". The time interval T1 generated in the NCO 20 at the time of 2π-shift is expressed by an equation (6) provided below.

$$T1 = (1/CLK1) + (1/CLK1) \times (\Delta\theta/2\pi) - (1/CLK1) - \Delta\theta \quad (6)$$
$$= (1/CLK1) \times (\Delta\theta/2\pi) - \Delta\theta$$
$$= 0$$

As described above, in the NCO 20 of the present embodiment, the phase (i.e. the phase signal θ) does not change at the time of the 2π-shift.

On the other hand, at the time of the 2π-shift, in the symbol timing recovery circuit 100 of the present embodiment, decimation of the data decision point data/zero-crossing point data is performed by the decimation circuit 3. In the example shown in FIG. 4, the sampled data s3 and s4 overlap with each other, and therefore the sampled data s4 is decimated. In the example shown in FIG. 10, when the phase signal θ output from the NCO transits from a point A to a point B, the point B is to be a decimation point. In the NCO 20 of the present embodiment, as shown in the equation (6) above, the phase lead of the phase signal θ is "zero" at this decimation point.

Here, both of the sampled data s3 and s4 are converted into the data at the data decision point k3 by the FIR filter 2 as shown in FIG. 4. In other words, in FIG. 10, the phase signal θ at the point A and the phase signal θ at the point B should be the same as each other (or a state that one is shifted by 2 g from another). In the NCO 20 of the present embodiment, as shown in the equation (6) above, the phase signal θ at the point A and the phase signal θ at the point B are the same as each other. Consequently, in the symbol timing recovery circuit 100 of the present embodiment, computing errors by the NCO are not generated at the decimation timing.

Figure 12:
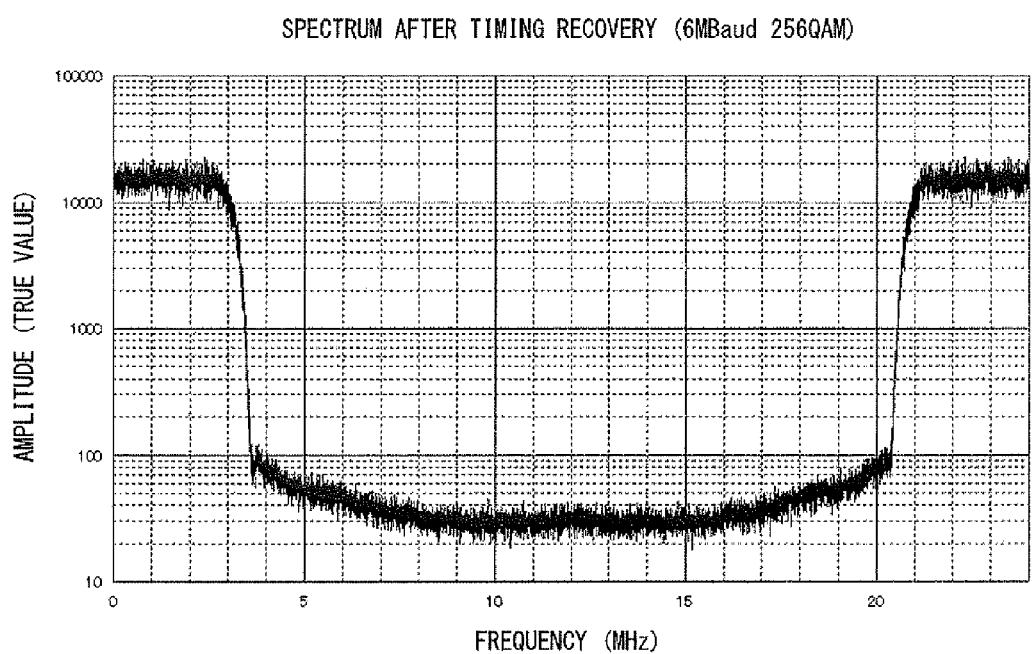
FIG. 12 is a diagram showing spectrum of an output signal of the symbol timing recovery circuit of the embodiment.

FIG. 12 is a diagram showing spectrum of the output signal of the symbol timing recovery circuit 100 of the present embodiment. Note that the spectrum is obtained by a simulation of a 6M baud 256-QAM modulated signal.

Figure 2:
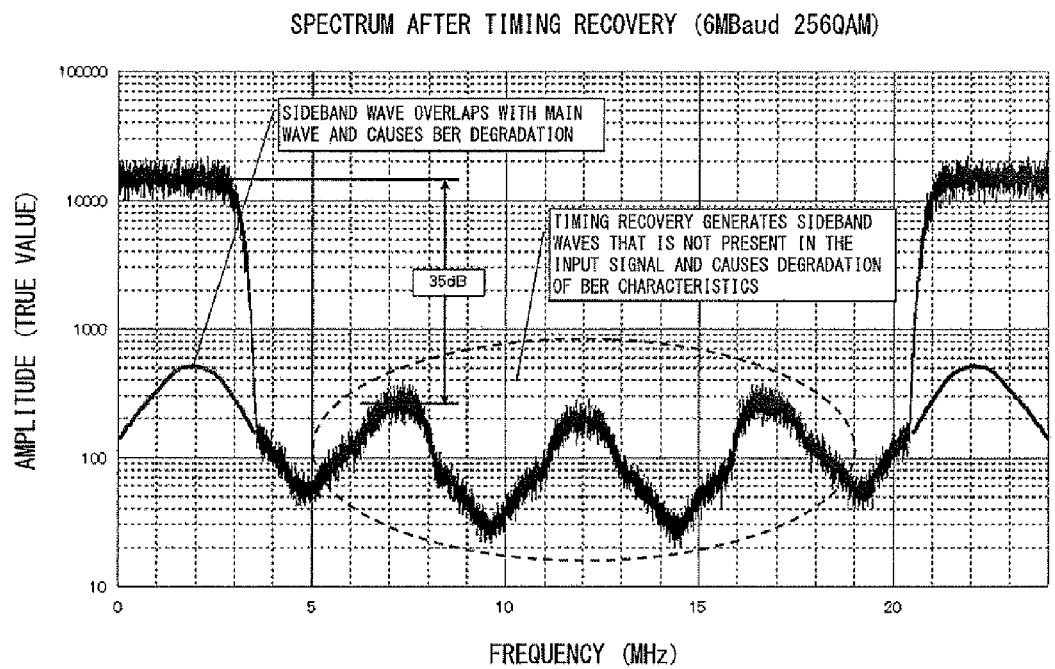
FIG. 2 is a diagram showing spectrum of the output signal of the symbol timing recovery circuit shown in FIG. 1.

According to the symbol timing recovery circuit 100 of the present embodiment, unlike the conventional symbol timing recovery circuit shown in FIG. 2, side waves are not generated. Therefore, in the symbol timing recovery circuit 100 of the present embodiment, recovery accuracy of the symbol timing is improved. In response to the improvement of the recovery accuracy of the symbol timing, BER (Bit Error Rate) characteristics are also improved.

It should be noted that when FIG. 7 is compared with FIG. 10, the amplitude of the phase signal θ of the NCO 20 of the present embodiment is larger than the amplitude of the conventional art. If the NCO shown in FIG. 7 is employed here, the convergence value of the loop filter 5 is expressed by an equation (7) provided below.

$$\text{Convergence value} = (2^{24}-1) \times (CLK1 - (1/T_s))/CLK1 \quad (7)$$

On the other hand, if the NCO 20 of the present embodiment is employed, the convergence value of the loop filter 5 is expressed by an equation (8) provided below.

$$\text{Convergence value} = (2^{24}-1) \times (CLK1 - (1/T_s))/(CLK1 - (1-T_s)) \quad (8)$$

As shown above, in the symbol timing recovery circuit 100 of the present embodiment, the convergence value of the loop filter 5 (i.e. phase error Δθ) is larger than that of the symbol timing recovery circuit that installs the NCO shown in FIG. 7. As a result, the cycle of the phase signal θ (i.e. the cycle of the saw-tooth wave) is the same in the conventional configuration and in the configuration of the present embodiment.

In the symbol timing recovery circuit 100 of the present embodiment, the fluctuation range of the phase signal θ is not limited to "$-\pi \leqq \theta \leqq \pi$". In other words, the phase signal θ can be in a range "$\theta \leqq -\pi$". The tap coefficient computing unit 7 of the present embodiment can obtain the tap coefficients a0-a4 of the range "$\theta \leqq -\pi$" in addition to those of the range "$-\pi \leqq \theta \leqq \pi$".

Figure 13:
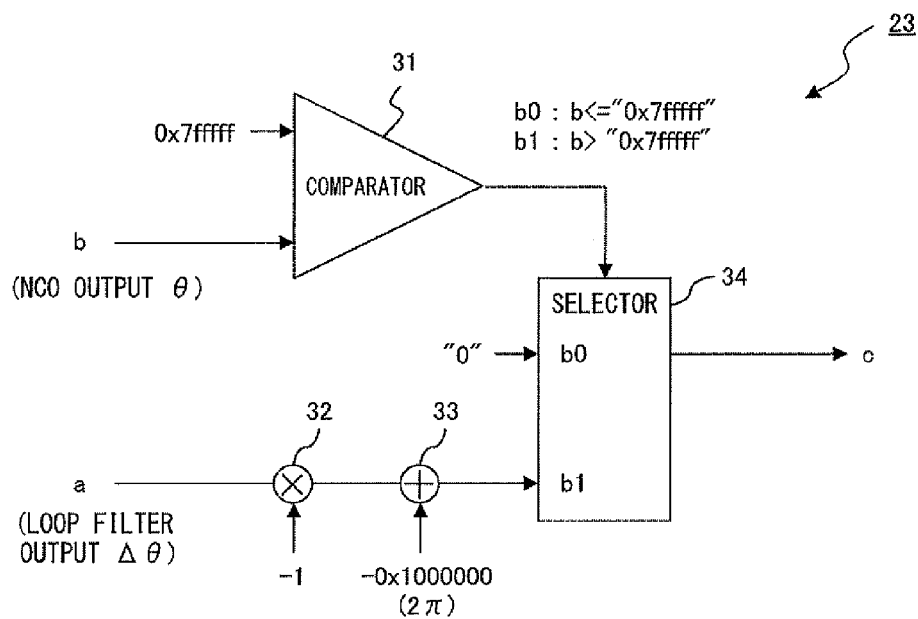
FIG. 13 is an example of an addition control circuit.

FIG. 13 is an example of the addition control circuit 23. In this example, the addition control circuit 23 comprises a comparator 31, a multiplier 32, an adder 33, and a selector 34. One of the input terminals of the comparator 31 is provided with "0x7fffff", and another input terminal is provided with a signal b. Here, the signal b corresponds to the phase signal θ. The comparator 31 outputs a signal b0 when "b≦0x7fffff", and outputs a signal b1 when "b>0x7fffff".

The multiplier 32 multiplies the signal a by "−1". In other words, the multiplier 32 generates "−a". The adder 33 adds "−0x1000000" to the output value of the multiplier 32. Here, "a" corresponds to the phase error data Δθ, and "0x1000000" corresponds to "2π". Consequently, the output of the adder should be "$-2\pi - \Delta\theta$". The output of the adder 33 is provided to the b1 terminal of the selector 34. On the other hand, the b0 terminal of the selector 34 is provided with "zero". The selector 34, when provided with the signal b0 form the comparator 31, selects the b0 terminal. As a result, "zero" is output. Meanwhile, when provided with the signal b1, the selector 34 selects the b1 terminal. As a result, "$-2\pi - \Delta\theta$" is output.

It should be noted that although the addition control circuit 23 is realized by a hardware circuit in the present embodiment, it is possible to realize the circuit with software.

In the above example, although the saw-tooth wave signal generated by the NCO 20 shows upward-increase, the present invention is not limited to such a case. Note that "upward-increase" means a waveform such that the phase signal θ shows approximately linear increase over time and the phase signal θ is reset when exceeding a threshold.

Figure 14:
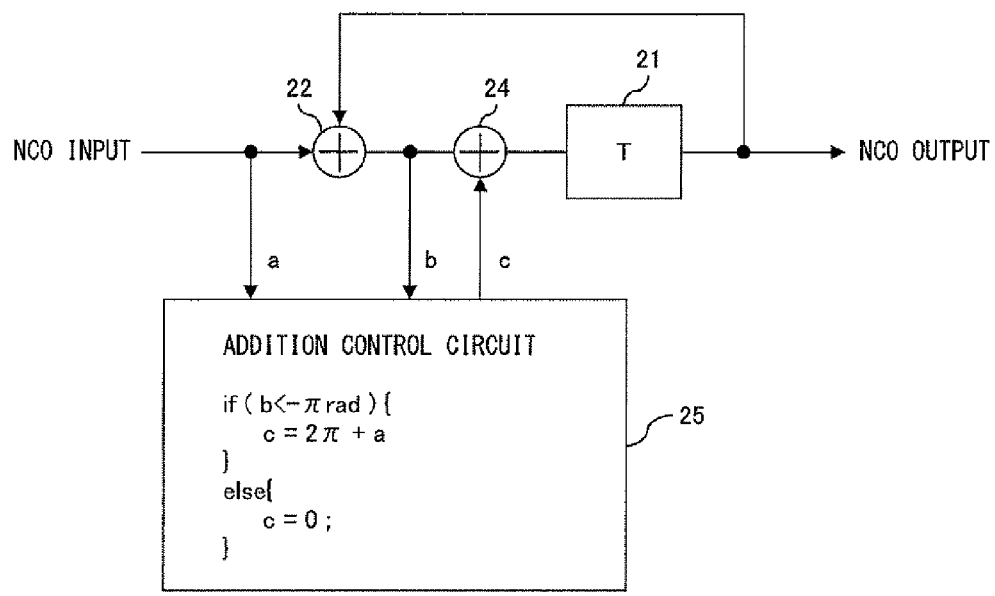
FIG. 14 is a diagram showing a configuration of the NCO of another embodiment.

FIG. 14 is a diagram showing a configuration of the NCO of another embodiment. This NCO is employed when the saw-tooth wave signal shows downward-decline. Note that "downward decline" means a waveform such that the phase signal θ shows approximately linear decrease over time and the phase signal θ is reset when dropping below a threshold. The NCO shown in FIG. 14 comprises a delay element 21, an adder 22, an adder 24, and an addition control circuit 25. The addition control circuit 25 outputs "2π+a" when the phase signal θ becomes smaller than "$-\pi$". Note that "a" corresponds to "Δθ". In other words, in the NCO shown in FIG. 14, when the phase signal θ becomes smaller than "$-\pi$", "2π+Δθ" is added to the phase signal θ.

As described above, an operation to subtract "2π+Δθ" from the phase signal θ is performed when the saw-tooth wave signal shows upward-increase. On the other hand, an operation to add "2π+Δθ" to the phase signal θ is performed when the saw-tooth wave signal shows downward-decline. These operations are substantially the same processing.

Figure 15:
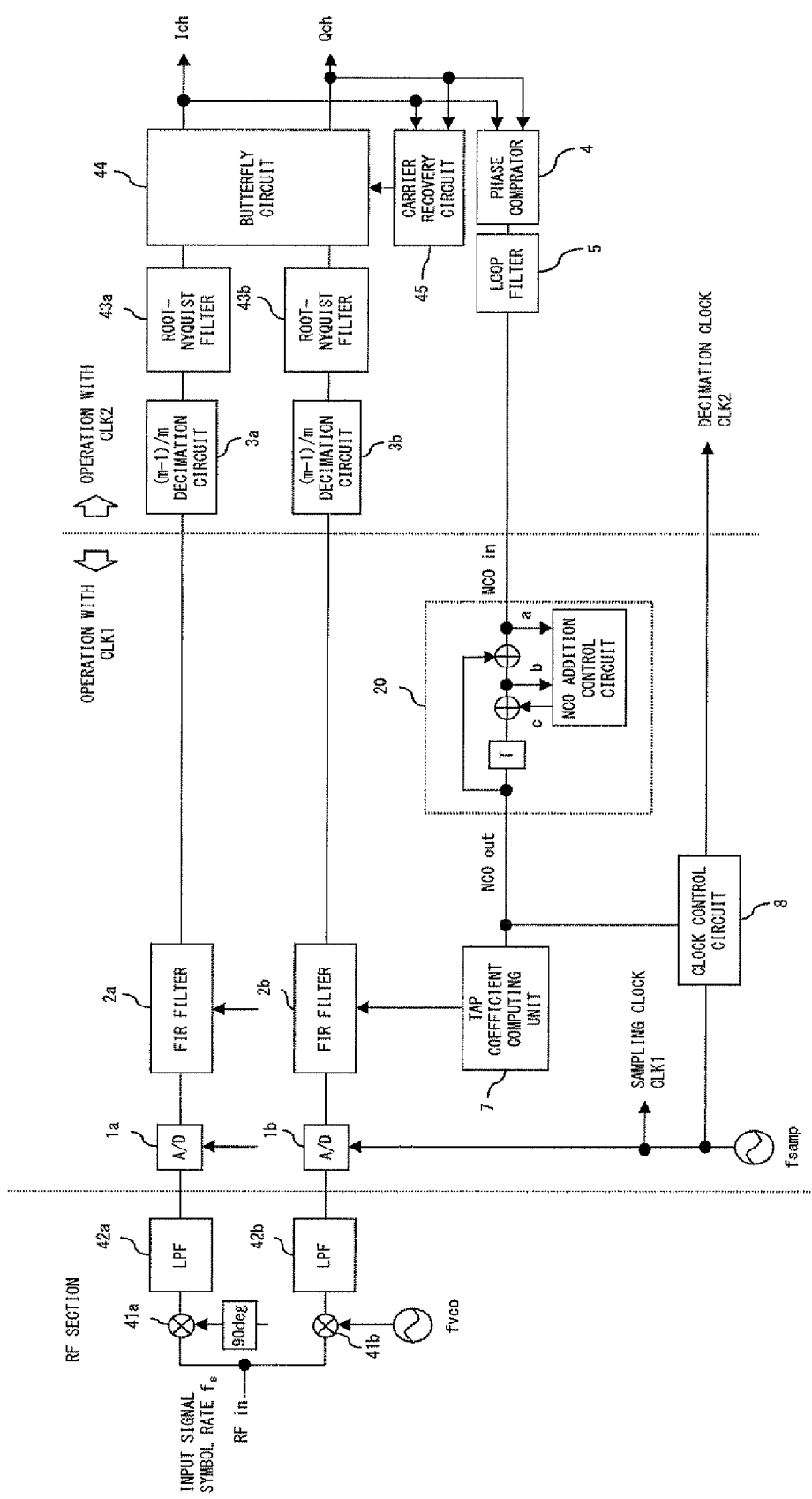
FIG. 15 is a diagram showing a configuration of a receiver apparatus that has the symbol timing recovery circuit of the embodiment.

FIG. 15 is a diagram showing a configuration of a receiver apparatus that has the symbol timing recovery circuit of the present embodiment. Assume that the receiver apparatus receives and demodulates a Quadrature Phase Shifting Keyed (QPSK) signal. The QPSK signal is for example transmitted on a radio carrier wave.

An input RF signal is multiplied by a local signal (provided from $f_{vco}$) in a pair of mixers 41a and 41b. Note that the phase of local signals provided to the pair of mixers 41a and 41b are shifted with each other by 90 degrees. The frequency of the local signal is approximately the same as the frequency of the radio carrier wave. As a result, a pair of baseband signals (I-phase signal and Q-phase signal) is obtained. Note that the frequencies of the radio carrier wave and the local signal do not match completely. Therefore, the signal point (constellation) of the QPSK signal detected in the receiver apparatus rotates on an I/Q-phase plane at a frequency same as the frequency difference between the two signals.

low-pass filter (LPF) 42a and 42b filter the I-phase signal and the Q-phase signal, respectively. The output signals of the LPF 42a and 42b are provided to the symbol timing recovery circuit.

The symbol timing recovery circuit comprises A/D converters 1a and 1b, FIR filters 2a and 2b, decimation circuits 3a and 3b, a phase comparator 4, a loop filter 5, an NCO 20, a tap coefficient computing unit 7, and a clock control circuit 8. Note that the A/D converter 1a, the FIR filter 2a, and the decimation circuit 3a process the I-phase signal, and the A/D converter 1b, the FIR filter 2b, and the decimation circuit 3b process the Q-phase signal.

The symbol timing recovery circuit generates a decimation clock CLK2 that has a frequency twice as high as the symbol rate of the input QPSK signal. By the pair of the decimation circuit 3a and 3b, a recovery signal synchronized with the decimation clock CLK2 is obtained.

A pair of recovery signal is input to a butterfly circuit 44 via Root-Nyquist filters 43a and 43b. The butterfly circuit 44 removes remaining carrier component form the recovery signal by linear transformation based on the control signal form a carrier recovery circuit 45. As a result, an I-channel signal and a Q-channel signal are obtained. The carrier recovery circuit 45 detects a rotational component of a signal point on a phase plane based on the I-channel signal and the Q-channel signal, and generates a control signal to be provided to the butterfly circuit 44.

It should be noted that the phase comparator 4 detects the phase error in a time-axial direction of the input QPSL signal from the I-channel signal and the Q-channel signal output from the butterfly circuit 44.

Figure 16:
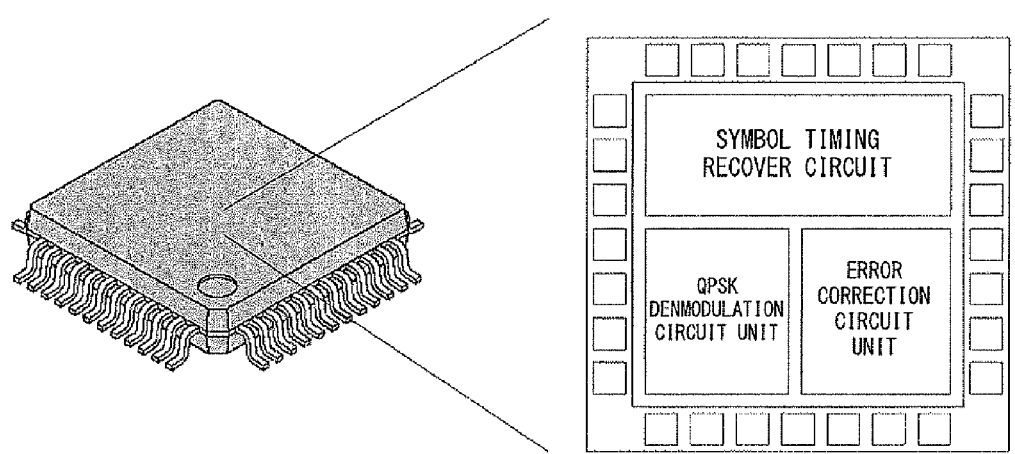
FIG. 16 shows an example of a semiconductor device in which the symbol timing recovery circuit of the embodiment is formed.

FIG. 16 shows an example of a semiconductor device in which the symbol timing recovery circuit 100 of the present embodiment is formed. In this example, a QPSK demodulation circuit, a symbol timing recovery circuit, and an error correction circuit is formed on a single semiconductor chip.

These circuits are described with a Hardware Description Language, for example. In such a case, the described circuit data is input to logic synthesis tool that operates on a computer, and optimized logic circuit data is generated. Next, the optimized logic circuit data is input to an automatic layout tool that operates on the computer. As a result, cell arrangement and wiring between cells on the chip is determined. Based on the layout data, masking pattern for Large-Scale Integration (LSI) manufacturing is created, and a semiconductor device is manufactured by using the masking pattern.

It should be noted that in the example above, the number of taps of the FIR filter is 5; however, the present invention is not limited to such a configuration. In other words, the FIR filter 2 can have any number of taps.

Additionally, in the example above, the data at the zero-crossing point/data decision point is generated from the sampled data by using the FIR filter; however, the present invention is not limited to such a configuration. In other words, the data at the zero-crossing point/data decision point can be generated from the sampled data by using other digital filters.

Furthermore, in the present invention, the input signal from which the symbol timing is to be recovered is not limited in particular, and such an input signal should include a PSK signal and a QAM signal, for example.

What is claimed is:

1. A symbol timing recovery circuit for recovering a symbol timing of an input signal, comprising:
    a sampling unit for sampling the input signal using a first clock;
    an interpolation unit for generating interpolation data of the input signal by performing interpolation using sampled data obtained by the sampling unit;
    a decimation unit for decimating the interpolation data obtained by the interpolation unit using a second clock;
    a phase comparator for detecting a phase error of an output signal of the decimation unit;
    a loop filter for smoothing the output signal of the phase comparator;
    a numerically controlled oscillator for generating an oscillation signal with a frequency in accordance with an output of the loop filter;
    an interpolation control unit for controlling an operation of the interpolation unit in accordance with the oscillation signal; and
    a clock control unit for generating the second clock form the first clock in accordance with the oscillation signal,
    wherein the numerically controlled oscillator generates the oscillation signal by cumulatively adding an output value of the loop filter and subtracting a certain value and the output value of the loop filter from the added value when the added value exceeds a threshold.

2. The symbol timing recovery circuit according to claim 1, wherein
    the certain value is equivalent to $2\pi$ when the certain value is converted into the phase of the first clock.

3. The symbol timing recovery circuit according to claim 1, wherein the numerically controlled oscillator comprises:
    an integration circuit for integrating the output value of the loop filter;
    a comparator for comparing an output value of the integration circuit with the threshold;
    a selector for outputting a sum of the certain value and the output value of the loop filter when the output value of the integration circuit exceeds the threshold in the comparator; and
    a computing unit for subtracting an output of the selector form the input value of the integration circuit.

4. The symbol timing recovery circuit according to claim 3, wherein
    the selector outputs zero when the output value of the integration circuit does not exceed the threshold in the comparator.

5. The symbol timing recovery circuit according to claim 1, wherein
    the sampling unit is an analog-to-digital (A/D) converter.

6. The symbol timing recovery circuit according to claim 1, wherein
    the interpolation unit is an finite impulse response (FIR) filter, and
    the interpolation control unit generates a tap coefficient of the FIR filter in accordance with the oscillation signal.

7. The symbol timing recovery circuit according to claim 1, wherein
    the decimation unit is a flip-flop circuit for latching and outputting interpolation data obtained from the interpolation unit in accordance with the second clock.

8. The symbol timing recovery circuit according to claim 1, wherein
    the clock control unit generates the second clock by decimating a pulse of the first clock when the added value in the numerically controlled oscillator exceeds the threshold.

9. A receiver apparatus used in a communication system, comprising:
    a symbol timing recovery circuit; and
    a receiver circuit for performing a receiving operation using a clock generated by the symbol timing recovery circuit, wherein the symbol timing recovery circuit includes:
    a sampling unit for sampling an input signal using a first clock;
    an interpolation unit for generating interpolation data of the input signal by performing interpolation using sampled data obtained by the sampling unit;
    a decimation unit for decimating the interpolation data obtained by the interpolation unit using a second clock;
    a phase comparator for detecting a phase error of an output signal of the decimation unit;
    a loop filter for smoothing the output signal of the phase comparator;
    a numerically controlled oscillator for generating an oscillation signal with a frequency in accordance with an output of the loop filter;
    an interpolation control unit for controlling an operation of the interpolation unit in accordance with the oscillation signal; and
    a clock control unit for generating the second clock form the first clock in accordance with the oscillation signal,
    wherein the numerically controlled oscillator generates the oscillation signal by cumulatively adding an output value of the loop filter and subtracting a certain value and the output value of the loop filter from the added value when the added value exceeds a threshold.

10. A semiconductor device on which a symbol timing recovery circuit is formed, the symbol timing recovery circuit comprising:
    a sampling unit for sampling the input signal using a first clock;
    an interpolation unit for generating interpolation data of the input signal by performing interpolation using sampled data obtained by the sampling unit;
    a decimation unit for decimating the interpolation data obtained by the interpolation unit using a second clock;
    a phase comparator for detecting a phase error of an output signal of the decimation unit;
    a loop filter for smoothing the output signal of the phase comparator;
    a numerically controlled oscillator for generating an oscillation signal with a frequency in accordance with an output of the loop filter;
    an interpolation control unit for controlling an operation of the interpolation unit in accordance with the oscillation signal; and
    a clock control unit for generating the second clock form the first clock in accordance with the oscillation signal,
    wherein the numerically controlled oscillator generates the oscillation signal by cumulatively adding an output value of the loop filter and subtracting a certain value and the output value of the loop filter from the added value when the added value exceeds a threshold.

11. A symbol timing recovery circuit for recovering a symbol timing of an input signal, comprising:

a sampling unit for sampling the input signal using a first clock;

an interpolation unit for generating interpolation data of the input signal by performing interpolation using sampled data obtained by the sampling unit;

a decimation unit for decimating the interpolation data obtained by the interpolation unit using a second clock;

a phase error detection unit for detecting a phase error of an output signal of the decimation unit;

a numerically controlled oscillator for generating an oscillation signal with a frequency in accordance with the phase error;

an interpolation control unit for controlling an operation of the interpolation unit in accordance with the oscillation signal; and a clock control unit for generating the second clock form the first clock in accordance with the oscillation signal, wherein the numerically controlled oscillator generates the oscillation signal by cumulatively adding the phase error and subtracting a certain value and the phase error from the added value when the added value exceeds a threshold.

12. A symbol timing recovery circuit for recovering a symbol timing of an input signal, comprising:

a sampling unit for sampling the input signal using a first clock;

an interpolation unit for generating interpolation data of the input signal by performing interpolation using sampled data obtained by the sampling unit;

a decimation unit for decimating the interpolation data obtained by the interpolation unit using a second clock;

a phase comparator for detecting a phase error of an output signal of the decimation unit;

a loop filter for smoothing the output signal of the phase comparator;

a numerically controlled oscillator for generating an oscillation signal with a frequency in accordance with an output of the loop filter;

an interpolation control unit for controlling an operation of the interpolation unit in accordance with the oscillation signal; and a clock control unit for generating the second clock form the first clock in accordance with the oscillation signal, wherein the numerically controlled oscillator generates the oscillation signal by cumulatively adding an output value of the loop filter and outputting a value that represents a same phase as a phase of an immediately previous output value when the added value exceeds a threshold.

* * * * *